March 16, 1926.
L. N. SOUTHMAYD
1,576,555
PNEUMATIC TIRE VALVE MECHANISM
Filed April 28, 1923   2 Sheets-Sheet 1
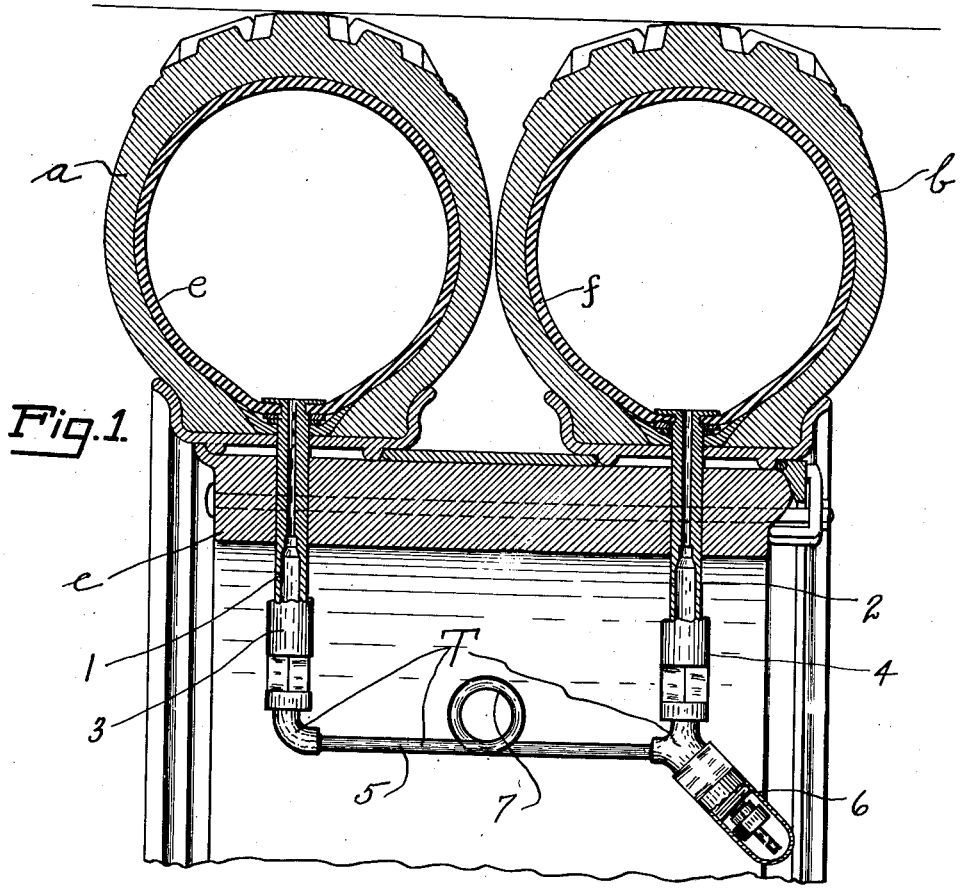
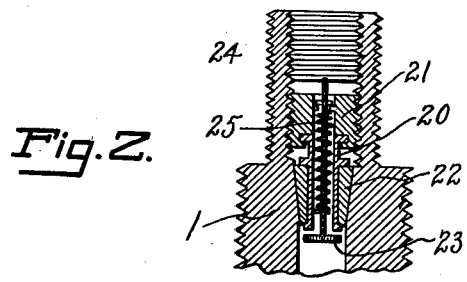
INVENTOR.
BY *Leon N. Southmayd.*
*Franklin S. Neal*
ATTORNEY.

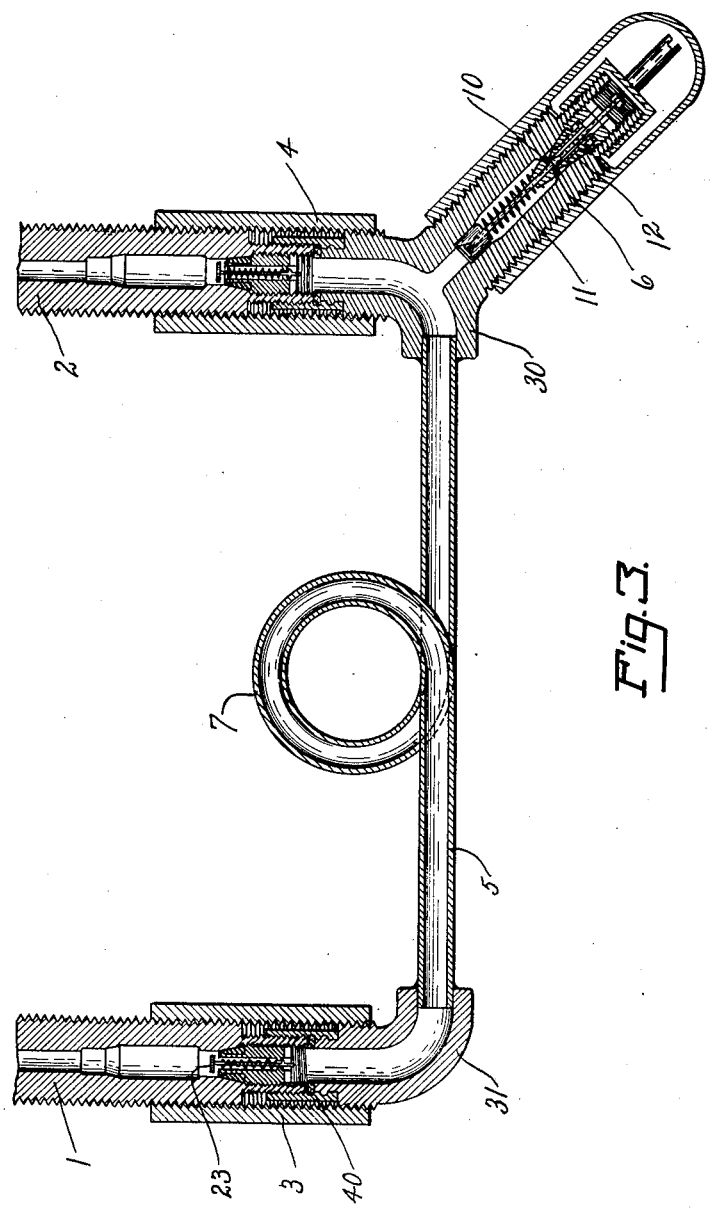

Patented Mar. 16, 1926.

1,576,555

UNITED STATES PATENT OFFICE.

LEON N. SOUTHMAYD, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

PNEUMATIC-TIRE VALVE MECHANISM.

Application filed April 28, 1923. Serial No. 635,225.

*To all whom it may concern:*

Be it known that I, LEON N. SOUTHMAYD, a citizen of the United States of America, residing at Springfield, in the county of Hampden and State of Massachusetts, have invented certain new and useful Improvements in Pneumatic-Tire Valve Mechanism, of which the following is a specification.

This invention in valve mechanism is made for controlling the inflation of dual pneumatic tires. Such tires are commonly used on the rear of trucks or busses under heavy service conditions. Therefore it is important that each tire give equal service. To do this, each tire must have that inflation suitable for the service conditions. These conditions vary so widely that the ordinary driver cannot be depended upon to appreciate what is needed, and much less to supply the need. The valve mechanism embodied in this invention is designed to control the relative tire inflation between two tires on one wheel and to do so in various ways with a small equipment peculiarly suitable for application to the standard valve used in pneumatic tires.

According to one feature of my invention, the valves of dual tires are connected to a manifold tube provided with one regular air valve which may function for both tires to inflate them to the same pressure and test said pressure through the same valve. With this arrangement each tire valve may be left to function independently of the other and of the like valve in the manifold tube to retain the air. But under some service conditions it is desirable to insure the maintenance of the same pressure in each tire and then the regular tire valve shells of the tires may be provided with a normally open instead of closed valve to the common tube, constructed, however, to immediately close in that tire which can remain inflated when the other tire has a blowout. With the open valve arrangement in the tire valves proper, the air valve in the manifold tube is of the usual normally closed type so that both tires may be inflated to the same pressure through such valve and also tested for the pressure through said valve. These simple arrangements will be entirely clear from the detailed description of the invention.

In the drawings:

Fig. 1 is a sectional view through the rim of a wheel on which dual pneumatic tires are mounted in the regular way. This figure also shows in section one independent tire valve shell as regularly mounted in each inner tube and shows the manifold tube connected to said valve shells.

Fig. 2 is a sectional detail view showing the upper end of a regular standard air valve shell but with a normally open valve instead of a normally closed valve inserted in said shell.

Fig. 3 is an enlarged sectional view showing the manifold tube provided with one regular air valve and attached to the two valve shells of the dual tires shown in Fig. 1, said valve shells being provided with the valve mechanism of Fig. 2, and the regular air valve of the manifold tube in section to indicate the difference.

Referring to Fig. 1, the dual tires *a* and *b* containing inner tubes *e* and *f* are mounted on separate rims and removably placed on the single wheel felly *c* according to the modern dual tire construction. This construction alone does not constitute my invention, but is indicated to show how the invention is used in combination with such construction.

The regular tire valve shells 1 and 2 extend respectively from the inner tubes *e* and *f*. Such shells have attached to their outer ends the manifold tube T. This manifold attachment preferably consists of two castings, each removably attached to one of the valve shells 1 and 2 (braced thereon by sleeves 3 and 4) instead of the usual valve caps, and connected to each other by a flexible bent metal pipe 5. The casting attached to the tire *b* has a regular type of air valve 6 extending from it in convenient position for inflation or testing purposes at the outer side of the wheel. A preferred arrangement of the parts is all indicated in Fig. 1 but the details are best shown in the enlarged section of Fig. 3.

Referring to Fig. 3 each valve shell is shown as of standard construction used by practically all tire makers today. It is illustrated as of the same construction as that disclosed in U. S. patent to Schweinert 1,171,147 of February 8, 1916. The tire valve 6 is provided with the same mechanism (what is called the valve insides) as is shown in said patent. It is a normally closed valve in which spring 11 presses the valve proper or plunger 10 to close the bore of plug 12. The latter is screwed down within the shell to a point where it seals against the taper indicated. No further description is deemed necessary as this construction is known and is fully described in the patented art. A valve cap and dust cap complete valve 6 for normal use. The same type of valve insides as is used in valve 6 may be likewise used in the valve shells 1 and 2, and such valve shells are so provided of standard construction that the standard valve insides may be inserted or removed as desired. I have, however, shown in valve shells 1 and 2 of Fig. 3, a modified valve insides so that each air passage is normally open. This modification is best shown in Fig. 2.

Referring to Fig. 2, the plug 21 is threaded to engage the internal threads of the valve shell. It is rotatably connected as shown to a flanged cylindrical part 20 with a tapered packing material 22 to seal these valve insides in the same manner exactly as the standard valve plug is sealed or seated in place within the shell. But the valve proper 23 and its operation is different. This valve 23 has a plunger 24 extending upwardly within the air passage bore of the plug 21 and with an enlarged upper end or cross extension to keep the valve from falling out. A spring 25 is compressed between lugs on the plug and a fixed part of the valve or plunger as indicated so that the valve 23 is normally open. This spring 25 is sufficiently strong to hold the valve 23 open when the pressure on each side of said valve is substantially the same. It is so arranged, however, as indicated, that if the pressure on the under side of the valve is enough greater than the pressure on its upper side as to cause the air to move outwardly with any rush, the valve 23 will close against the spring and stay closed as long as the difference in pressure is enough greater than the spring pressure. By making the spring pressure sufficient to hold the valve open for a normal exchange of air between two dual tires under normal pressure conditions and in service, my purpose is accomplished as will be explained.

The manifold construction is preferably made up of two castings 30 and 31. The former may include the shell of air valve 6. These castings are essentially like elbow pipe fittings with each having a union 40 permanently and rotatably attached to one end so as to screw on its respective valve shell in place of the ordinary valve cap. In order to give an improved attaching support I provide threads on each casting beyond the union so that sleeves 3 and 4 may screw onto the castings as well as onto the outer threads of the valve shells. After the unions are attached, these sleeves may be turned up and engage the threads of the castings so that the sleeves serve as rigid bridges between the castings and valve shells enclosing the unions and serve so that both castings are most effectively bound and supported on the standard air valve shells. The ends of the castings 30 and 31 opposite the unions are permanently connected by the flexible metal pipe 5 preferably provided with the turn 7 so that the pipe as a whole while rigid enough will nevertheless yield sufficiently to permit movement without causing a leak and permit bending or extension for a considerable degree of adjustment as the space between two dual tire valves may vary. This pipe 5 may be made of a copper alloy which will give the advantage of a stiff pipe and yet bend rather than break under most strains.

In the use of dual tires the usual road run may be upon smooth substantially flat pavements. If so, my valve mechanism may preferably be provided with regular standard inside valve parts for all three valves. In this case the manifold with valve 6 is attached as described. The valve 6 will serve with the manifold as a common inflating valve for both tires and as an additional guard against leaks from the ordinary tire valves. It is a considerable convenience to inflate and test the pressure of both tires through the one valve 6 but more important is the fact that they will both be inflated to the same pressure and thus guard against the operator's carelessness in this respect.

Where the vehicle with dual tires is used on a crowned road, for example in running for miles on the side of the road where the inside wheel (the one next the curb or ditch) in particular will have its dual tires almost constantly under different respective load conditions, the air pressures should be adjusted to the work. If therefore the regular valve insides are removed from the valve shells and the valve insides like those shown in Fig. 2 are inserted, improved results will follow. The tires may be inflated to the same pressure through the one regular air valve 6 and in addition both tires may be tested from time to time through the one valve 6, which is a convenience. But in the service the manifold connection between the tires being normally open, the air is free to flow from one tire to the other and in a real sense automatically balance the work done by the two tires. At least so far as an equal pressure in said tires is desirable, the operator is not depended upon to guard the condition because the valve mechanism is automatic in this respect. If a blowout should occur in one tire, the air pressure in the manifold will immediately drop. This will result in that valve of the good tire being immediately closed. The vehicle can therefore continue to a suitable place for a tire change, preferably to the end of the route. Thus the valve mechanism is automatic in action both to equalize the pressure during service and to hold the air in the good tire when the other one blows out.

The valve mechanism is particularly useful in the respects described and in connection with its use I call attention to the importance of those structural features by which I use standard tire valve equipment. In the specific form of my invention illustrated, the truck or bus with dual tires may be taken as found, my mechanism attached in either form as readily as a valve cap. The operator has practically no care to exercise on his part any more than he would if single instead of dual tires were used.

I am aware that other attempts have been made to improve the valve mechanism for dual tires, for example in U. S. Patent 1,134,701, but the structure claimed herein can be readily distinguished from the prior art.

What I claim is:

1. A valve mechanism for dual tires comprising two independent normally open valves, mounted one in the valve stem of each tire, a manifold connecting the two valve stems, and a normally closed inflating valve located in the manifold, whereby the tires can be inflated to and maintained at equal pressures, but the air in either tire will be retained in it by a closure of its normally open valve upon a sudden decrease in pressure in the other tire.

2. Dual tires in combination with a valve mechanism comprising two independent normally open air valves mounted in the valve stems of said tires, one for each tire, an unobstructed manifold serving as a connection adapted to have its ends sealed to the outlet ends of said valves, a normally closed air valve in said manifold serving as a connection with the outside, either one of said normally open air valves being adapted to close upon a substantial decrease in pressure within the tire connected to the other one of the normally open valves.

LEON N. SOUTHMAYD.